US006772017B1

(12) United States Patent
Dove et al.

(10) Patent No.: US 6,772,017 B1
(45) Date of Patent: Aug. 3, 2004

(54) TOOL FOR CONFIGURING AND MANAGING A PROCESS CONTROL NETWORK INCLUDING THE USE OF SPATIAL INFORMATION

(75) Inventors: Andrew Philip Dove, Austin, TX (US); David Richard Gardner, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/488,335

(22) Filed: Jan. 20, 2000

(51) Int. Cl.[7] .............................................. G05B 11/01
(52) U.S. Cl. ........................................ 700/18; 700/17
(58) Field of Search ............................. 700/96, 97, 98, 700/83, 275; 345/969, 965

(56) References Cited

U.S. PATENT DOCUMENTS

| | | | | |
|---|---|---|---|---|
| 5,392,208 A | * | 2/1995 | Takita et al. .................. | 700/83 |
| 5,812,394 A | | 9/1998 | Lewis et al. .................. | 700/17 |
| 5,838,563 A | * | 11/1998 | Dove et al. .................... | 700/18 |
| 5,841,654 A | * | 11/1998 | Verissimo et al. .......... | 370/254 |
| 5,892,939 A | * | 4/1999 | Call et al. .................... | 345/764 |
| 5,898,860 A | * | 4/1999 | Leibold ....................... | 345/853 |
| 5,917,730 A | | 6/1999 | Rittie et al. ..................... | 703/6 |
| 5,940,294 A | * | 8/1999 | Dove ............................. | 700/83 |
| 5,943,236 A | * | 8/1999 | Ohno et al. ................... | 345/961 |
| 5,971,581 A | * | 10/1999 | Gretta et al. .................... | 700/2 |
| 6,020,889 A | * | 2/2000 | Tarbox et al. ............... | 345/736 |
| 6,282,455 B1 | * | 8/2001 | Engdahl ....................... | 434/72 |

FOREIGN PATENT DOCUMENTS

| | | |
|---|---|---|
| EP | 0 718 727 A2 | 6/1996 |
| EP | 0 751 648 A2 | 2/1997 |
| GB | 2336446 A | 2/1998 |

OTHER PUBLICATIONS

Examination Report under Section 18(3) issued in GB 0101255.8 application by the United Kingdom Patent Office on Jun. 17, 2003.

Office Action issued in corresponding German application 101 02 205.0–53 issued Sep. 18, 2003 (including translation).

* cited by examiner

*Primary Examiner*—Ramesh Patel
(74) *Attorney, Agent, or Firm*—Marshall, Gerstein & Borun LLP (57) ABSTRACT

The present invention is directed to a tool which includes spatial information for configuring and managing a process control system which conforms to a standard protocol. Such a tool advantageously allows the efficient design and use of a process control system while ensuring that the physical characteristics of the system conform to the standard. In addition, the tool provides for more efficient diagnostics, on-line debugging, alarm monitoring and device maintenance.

11 Claims, 8 Drawing Sheets

TOOL FOR CONFIGURING AND MANAGING A PROCESS CONTROL NETWORK INCLUDING THE USE OF SPATIAL INFORMATION

BACKGROUND OF THE INVENTION

1. Field of the Invention

The present invention relates generally to process control networks and more particularly to configuring and managing process control networks.

2. Description of the Related Art

Large processes such as chemical, petroleum and other manufacturing and refining processes include numerous field devices disposed at various locations within a facility to measure and control process parameters which thereby effect control of the process. These devices may be, for example, sensors such as temperature, pressure and flow rate sensors as well as control elements such as valves and switches. Historically, the process control industry used manual operations such as manually reading level and pressure gauges, turning valve wheels, etc., to operate the measurement and control field devices within a process.

Presently, control of the process is often implemented using microprocessor-based controllers, computers or workstations which monitor the process by sending and receiving commands and data to hardware devices to control either a particular aspect of the process or the entire process as a whole. The specific process control functions that are implemented by software programs in these microprocessors, computers or workstations may be individually designed, modified or changed through programming while requiring no modifications to the hardware. For example, an engineer might cause a program to be written to have the controller read a fluid level from a level sensor in a tank, compare the tank level with a predetermined desired level, and then open or close a feed valve based on whether the read level was lower or higher than the predetermined, desired level. The parameters are easily changed by displaying a selected view of the process and then by modifying the program using the selected view. The engineer typically would change parameters by displaying and modifying an engineer's view of the process.

The controller, computer or workstation stores and implements a centralized and, frequently, complex control scheme to effect measurement and control of process parameters according to an overall control scheme. Usually, however, the control scheme implemented is proprietary to the field device manufacturer, thus making the process control system difficult and expensive to expand, upgrade, reprogram and/or service because the field device provider must become involved in an integral way to perform any of these activities. Furthermore, the equipment that can be used or interconnected may be limited due to the proprietary nature of the field device and the situation where the provider may not support certain devices or functions of devices manufactured by other vendors.

To overcome some of the problems inherent in the use of proprietary field devices, the process control industry has developed a number of standard, open communication protocols including, for example, the HART®, DE, PROFIBUS®, WORLDFIP®, LONWORKS®, DeviceNet®, and CAN protocols. These standard protocols enable field devices made by different manufacturers to be used together within the same process control environment. In theory, any field device that conforms to one of these protocols can be used within a process to communicate with and to be controlled by a process control system or other controller that supports the protocol, even if the field devices are made by different manufacturers.

To implement control functions, each process control device includes a microprocessor having the capability to perform one or more basic control functions as well as the ability to communicate with other process control devices using a standard and open protocol. In this manner, field devices made by different manufacturers can be interconnected within a process control loop to communicate with one another and to perform one or more process control functions or control loops. Another example of an open communication protocol that allows devices made by different manufacturers to interoperate and communicate with one another via a standard bus to effect decentralized control within a process is the FOUNDATION Fieldbus protocol (hereinafter the "Fieldbus protocol") by the Fieldbus Foundation. The Fieldbus protocol is an all digital, two-wire loop protocol.

When using these protocols, a challenge associated with designing the process control system or network relates to the actual physical layout and interconnection of the various process control devices. Specifically, each of these protocols sets forth constraints of values for the physical characteristics within which a process control system must operate to conform to the standard. These constraints include the voltage drop across communication sections, the spur length, the overall cable length, the total current draw and the total number of process control devices on a particular hub. The physical location of vessels, pipes, pumps, motors and valves as well as controllers and operator stations also set forth constraints that must be taken into account when configuring the process control system or network. The interrelationship of these constraints are important and variable based upon the values of the constraints. Once the process control system or network is configured and in use, the managing of the system can be cumbersome due to the complexity of most refining and manufacturing facilities.

In addition to executing control processes, software programs also monitor and display a view of the processes, providing feedback in the form of an operator's display or view regarding the status of particular processes. The monitoring software programs also signal an alarm when a problem occurs. Some programs display instructions or suggestions to an operator when a problem occurs. The operator who is responsible for the control process needs to view the process from his point of view and correct the problem quickly. A display or console is typically provided as the interface between the microprocessor based controller or computer performing the process control function and the operator and also between the programmer or engineer and the microprocessor based controller or computer performing the process control function.

Systems that perform, monitor, control, and feed back functions in process control environments are typically implemented by software written in high-level computer programming languages such as Basic, Fortran or C and executed on a computer or controller. These high-level languages, although effective for process control programming, are not usually used or understood by process engineers, maintenance engineers, control engineers, operators and supervisors. Higher level graphical display languages have been developed for such personnel, such as continuous function block and ladder logic. Thus each of the engineers, maintenance personnel, operators, lab personnel and the like, require a graphical view of the elements of the process control system that enables them to view the system in terms relevant to their responsibilities.

The graphical view of the elements of the process control system are provided without correlation to the spatial layout of the facility and only show logical connections of the devices and functions. For example, a process control program might be written in Fortran and require two inputs, calculate the average of the inputs and produce an output value equal to the average of the two inputs. This program could be termed the AVERAGE function and may be invoked and referenced through a graphical display for the control engineers. A typical graphical display may consist of a rectangular block having two inputs, one output, and a label designating the block as AVERAGE. A different program may be used to create the graphical representation of this same function for an operator to view the average value. Before the system is delivered to the customer, these software programs are placed into a library of predefined user selectable features. The programs are identified by function blocks. A user may then invoke a function and select the predefined graphical representations illustrated by rectangular boxes to create different views for the operator, engineer, etc. by selecting one of a plurality of function blocks from the library for use in defining a process control solution logically rather than having to develop a completely new program in Fortran, for example.

A group of standardized functions, each designated by an associated function block, may be stored in a control library. A designer equipped with such a library can design process control solutions by logically interconnecting, on a computer display screen, various functions or elements selected with the function blocks represented by rectangular boxes to perform particular tasks. The microprocessor or computer associates each of the functions or elements defined by the function blocks with predefined templates stored in the library and relates each of the program functions or elements to each other according to the interconnections desired by the designer. A designer designs an entire process control program using logical views of predefined functions without ever correlating the design to the spatial dimensions of the refining or manufacturing facility.

One challenge associated with the graphical views provided is that only logical connections are shown. Presently, the physical layout of the facility is not correlated to the configuration of the process control system and cannot be referenced during the managing of the system. When configuring the process control system, spatial information must be manually measured and entered into the tool. When managing the process control system, the physical location of devices and controllers must be manually determined, often increasing the amount of time required to correct a problem or mange the process control system.

What is needed is a method of configuring a process control system that takes into account the physical layout of the facility as well as allows for operators of the system to quickly access the spatial location of process control devices and controllers.

SUMMARY OF THE INVENTION

The present invention is directed to using spatial information of a facility for configuring and managing a process control system which is included within the facility. The process control system may conform to a standard protocol. Such a system advantageously allows the efficient design and use of a process control system while ensuring that the physical characteristics of the system conform to the standard. In addition, such a system also advantageously provides for more efficient diagnostics, on-line debugging, alarm managing and device maintenance.

The tool may optionally provide automatic generation of the layout of the process control network applied to the spatial layout of the facility.

In another embodiment, the tool is used to analyze the layout of the process control network applied to the physical layout of the facility to assure that the layout of the network conforms to the criteria of a standard protocol, such as the Fieldbus protocol.

The tool may optionally provide blinking device representations to indicate active alarms in the network.

In another embodiment, the process control network is configured using logical connections first, and then at a later time the configuration is applied to the spatial layout of the facility and used for managing the process control network using the spatial information applied to the network layout.

BRIEF DESCRIPTION OF THE DRAWINGS

The present invention may be better understood, and its numerous objects, features, and advantages made apparent to those skilled in the art by referencing the accompanying drawings.

FIG. 1b is a block diagram of the controller/multiplexer and process portion of the process control system shown in FIG. 1a.

DETAILED DESCRIPTION

Figure 1A:
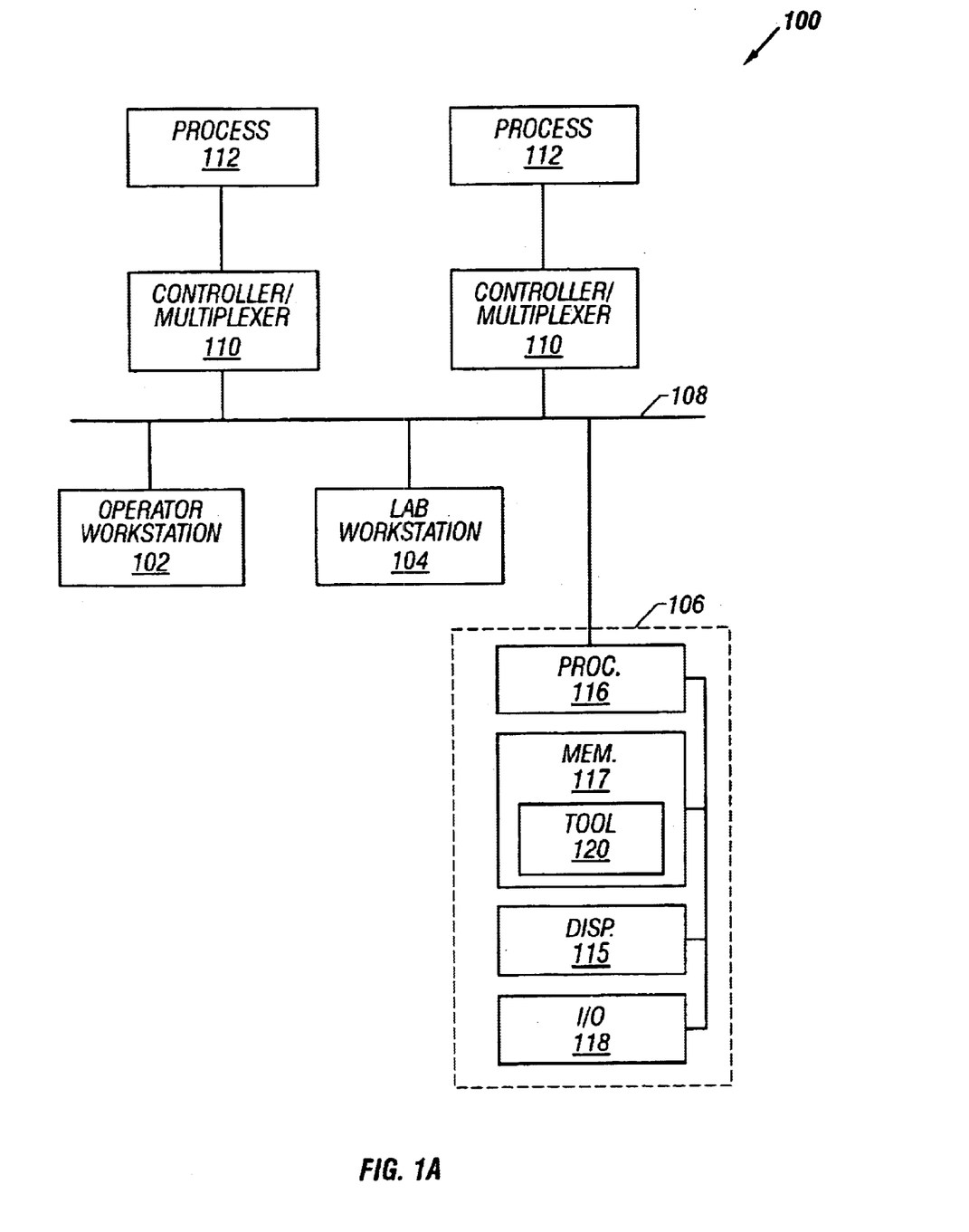
FIG. 1a is a schematic block diagram of a process control system showing a workstation including a tool in accordance with a generalized embodiment of the present invention which furnishes a spatial configuring and managing capability.

A process control environment 100 is shown in FIG. 1a and illustrates a control environment for implementing a digital control system, process controller or the like. The process control environment 100 includes an operator workstation 102, a lab workstation 104, and an engineering workstation 106 electrically interconnected by a local area network ("LAN") 108, or other known communication link, for transferring and receiving data and control signals among the various workstations and a plurality of controller/multiplexers 110. Workstations 102, 104, and 106 are, for example, computers which conform to the IBM compatible architecture. The workstations 102, 104, and 106 are shown connected by the LAN 108 to a plurality of the controller/multiplexers 110 that electrically interface between the workstations and a plurality of processes 112. In multiple various embodiments, the LAN 108 includes a single workstation connected directly to a controller/multiplexer 110 or alternatively includes a plurality of workstations, for example three workstations 102, 104, and 106, and many controller/multiplexers 110 depending upon the purposes and requirements of the process control environment 100. In some embodiments, a single process controller/multiplexer 110 controls several different processes 112 or alternatively controls a portion of a single process.

In the process control environment 100, a process control strategy is developed by creating a software control solution on the engineering workstation 106, for example, and transferring the solution via the LAN 108 to the operator workstation 102, lab workstation 104, and to controller/multiplexer 110 for execution. The operator workstation 102 supplies interface displays to the control/monitor strategy implemented in the controller/multiplexer 110 and communicates to one or more of the controller/multiplexers 110 to view the processes 112 and change control attribute values according to the requirements of the designed solution. The processes 112 are formed from one or more field devices, which may be smart field devices or conventional (non-smart) field devices.

In addition, the operator workstation 102 communicates visual and audio feedback to the operator regarding the status and conditions of the controlled processes 112. The engineering workstation 106 includes a processor 116, and a display 115 and one or more input/output or user-interface device 118 such as a keyboard, light pen and the like. The workstation also includes a memory 117, which includes both volatile and non-volatile memory. The memory 117 includes a control program that executes on the processor 116 to implement control operations and functions of the process control environment 100. The memory 117 also includes a configuring and managing tool 120 (also referred to as a control studio tool). The operator workstation 102, and other workstations (not shown) within the process control environment 100 include at least one central processing unit (not shown) which is electrically connected to a display (not shown) and a user-interface device (not shown) to allow interaction between a user and the processor.

Tool 120 is used for configuring of the process control network and to ensure that the process control network corresponds to a desired standard protocol, e.g., the Fieldbus protocol. Tool 120 may also be used during the managing of the process control network to provide for more efficient trouble shooting and maintenance. Tool 120 is preferably software that is stored in memory 117, but may be contained on computer readable media, and is executed by processor 116 of engineering workstation 106. The computer readable media may be a floppy disc, a CDROM or any other type of media on which software may be stored. The tool 120 enables screen presentations that are presented on display 115 of engineering workstation 106 which may show only the logical connection of process 112 or may include physical connections incorporating the spatial characteristics of the refining or manufacturing facility's layout.

While the tool of the present invention is described in detail in conjunction with a process control system that uses Fieldbus devices, it should be noted that the tool of the present invention can be used with process control systems that include other types of field devices and communication protocols, including protocols that rely on other than two-wire buses and protocols that support only analog or both analog and digital communications. Thus, for example, the tool of the present invention can be used in any process control system that communicates using the HART, PROFIBUS, etc. communication protocols or any other communication protocols that now exist or that may be developed in the future.

A general description of the Fieldbus protocol, field devices configured according to this protocol, the way in which communication occurs in a process control environment that implements the Fieldbus protocol, and example constraints of values that are required under the Fieldbus protocol will be provided. However, it should be understood that the Fieldbus protocol is known in the art and is described in detail in numerous articles, brochures and specifications published, distributed and available from, among others, the Fieldbus Foundation, a not-for-profit organization located in Austin, Tex. In particular, the Fieldbus protocol including constraints of values that are required under the Fieldbus protocol is described in detail in "Wiring and Installation 31.25 Kbits/sec. Voltage Mode Wire Medium Application Guide" Foundation Fieldbus, 1996.

Generally, the Fieldbus protocol is a digital, serial, two-way communication protocol that provides a standardized physical interface to a two-wire loop or bus interconnecting process control equipment such as sensors, actuators, controllers, valves, etc. included within an instrumentation or process control environment. The Fieldbus protocol provides, in effect, a local area network for field instruments (field devices) within a process, which enables these devices to perform control functions at locations distributed throughout a process and to communicate with one another before and after the performance of these control functions to implement an overall control strategy. Because the Fieldbus protocol enables control functions to be distributed throughout a process control network, the protocol reduces the complexity of, or entirely eliminates the necessity of, the centralized process controller. However, the distributed nature of the system adds complexity when managing the system and determining the physical location of problem devices when trouble shooting and managing the system.

The Fieldbus protocol allows for managing of the field devices and overall process control system by providing communication via device descriptions and function blocks. Field devices are field instruments such as transmitters and valves with processors that monitor device performance and state. A device description is similar to a driver for the device. For field devices, the device description includes the calibration procedures, parameter procedures, and other information required by the control system to communicate with the field device. Field devices notify the control system of standard operating parameters and are self-diagnosing and capable of reporting device problems such as instrument out of calibration to the control system. Each field device has a unique physical device tag and a corresponding network address.

For managing field devices, many types of communication is available, including: obtaining port and communication statistics, obtaining status of the field device, viewing and changing resource configuration and parameters, initiating master reset or self test of the field device, displaying status of the sensors and changing the sensor upper, lower and zero trim. By providing spatial information with the managing communications listed above, the managing features of the process control system are more efficient and easier to use.

Figure 1B:
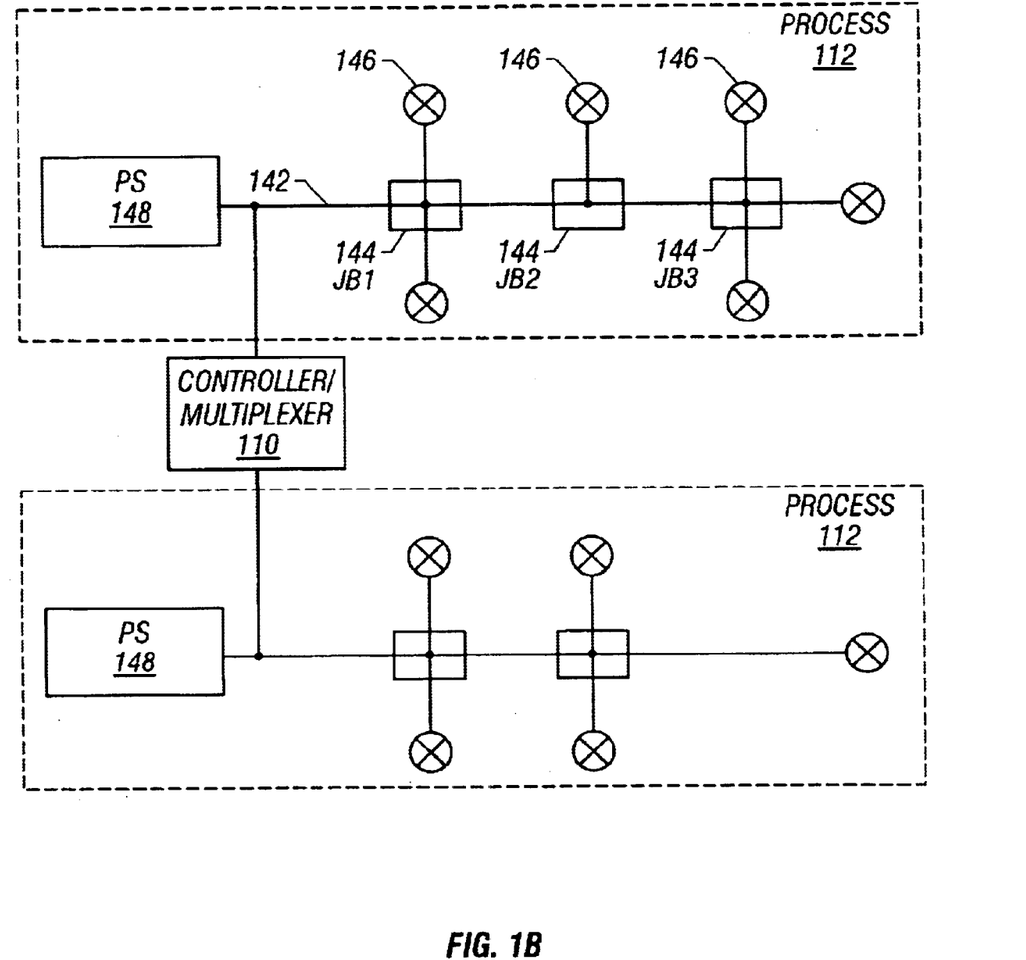

Referring to FIG. 1b, the controller/multiplexer and process portion of the process control network 100 of FIG. 1a conforming to the Fieldbus protocol is shown. The network includes a controller/multiplexer 110 which is coupled to one or more process 112 comprised of a plurality of field devices via a bus 142. The bus 142 includes a plurality of sections or segments having corresponding lengths as well as other characteristics. The bus 142 also may include one or more junction boxes 144 (JB1, JB2, JB3), which are often referred to as "bricks". Each junction box 144 may be coupled to one or more field bus devices 146 to the bus 142. Controller/multiplexer 110 is also coupled to at least one power supply 148. The network illustrated in FIG. 1b is illustrative only, there being many other ways in which a process control network may be configured using the Fieldbus protocol.

Process control network 100 includes a number of spatial characteristics such as the spur length of a particular communication section, the overall length of the bus, the total number of process control devices coupled to a particular junction box, and the physical location of the controllers and devices with respect to the layout of the refining or manufacturing facility. These spatial characteristics may be automatically measured and calculated during the configuration of the system, using the spatial information regarding the physical layout of the facility. Process control network 100 also includes a number of non-spatial characteristics such as the voltage drop across communication sections, the total current draw of a segment, and the types of devices in the system. These non-spatial characteristics are provided by the user when configuring the system. Tool 120 analyzes these characteristics to determine whether the process control network corresponds to the desired standard protocol.

Once the configuration of the process control system has been completed, tool 120, including the spatial layout of the system in the facility, can be used for managing of the process control system using any of the workstations 102, 104 or 106. The function of managing the process control system includes such functions as diagnostics, on-line debugging, alarm monitoring and device maintenance. During diagnostics and alarm monitoring, when a valve or other device fails, the device's representation on the screen of the display device may blink in the spatial view of the facility and be easily found. The device's tag name as well as the spatial location of the device can be used to identify the valve or other device. During on-line debugging, the values of the connectors and attributes in the function blocks can be shown in the spatial view of the facility allowing the user to more easily ascertain the current conditions of the system. During device maintenance, by selecting a device in the spatial view, current conditions and information about the device can be obtained, such as the current flow rate or latest maintenance records.

Figure 2:
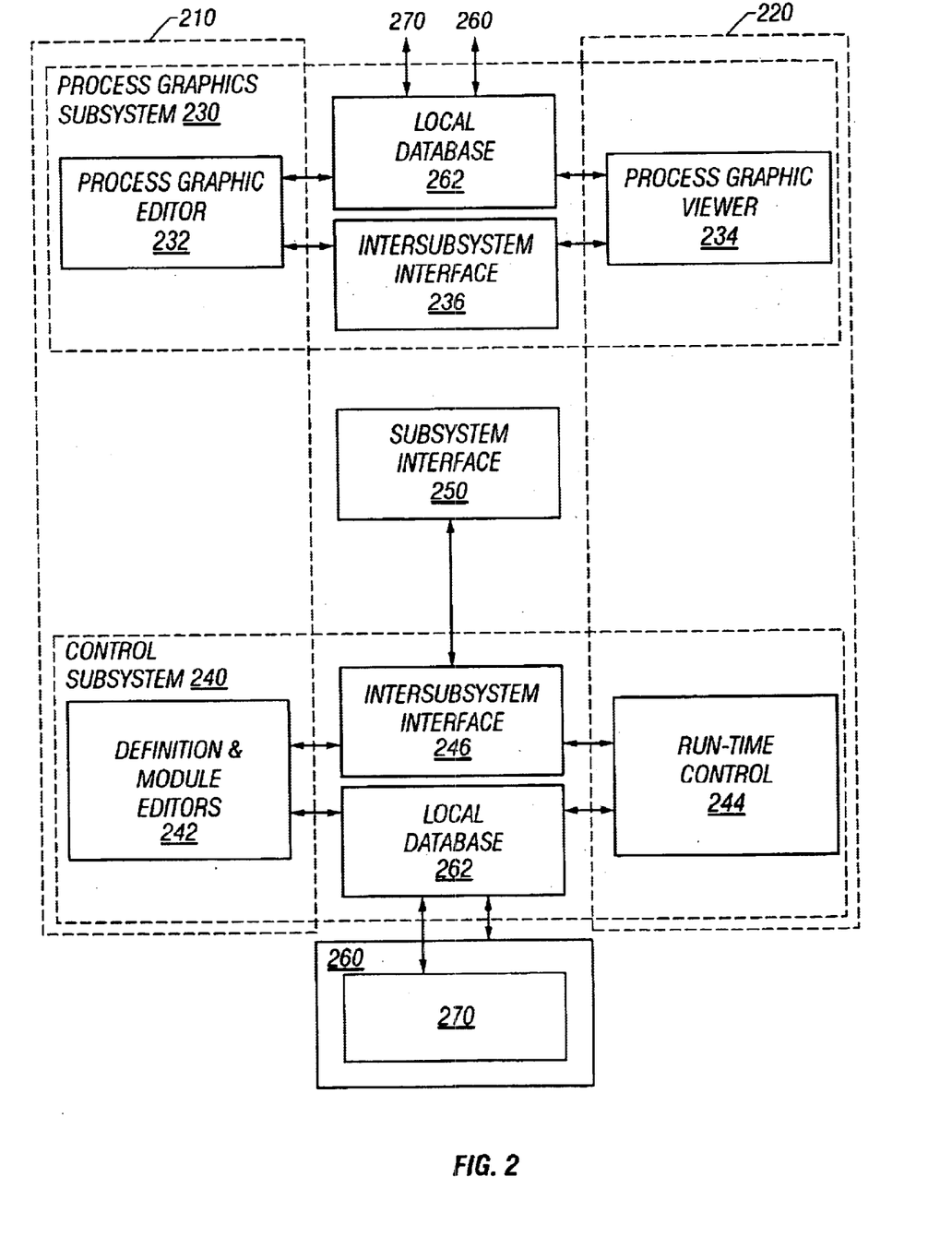
FIG. 2 is a schematic block diagram showing the process control environment in a configuration implementation and a management or run-time implementation.

The process control environment 100 exists in a configuration model or configuration implementation 210 and a managing or run-time model or implementation 220 shown in FIG. 2. In the configuration implementation 210, the component devices, objects, interconnections and interrelationships within the process control environment 100 are defined and related to the spatial information regarding the physical layout of the facility. In the run-time implementation 220, operations of the various component devices, objects, interconnections and interrelationships are performed. The configuration implementation 210 and the run-time implementation 220 are interconnected through a ASCII based download language. The download language creates system objects according to definitions supplied by a user and creates instances from the supplied definitions. In addition to downloading definitions, the download language also uploads instances and instance values. The configuration implementation 210 is activated to execute in the run-time implementation 220 using an installation procedure.

The process control environment 100 includes multiple subsystems with several of the subsystems having both a configuration and a run-time implementation. For example, a process graphic subsystem 230 supplies user-defined views and operator interfacing to the architecture of the process control environment 100. The process graphic subsystem 230 has a process graphic editor 232, a part of the configuration implementation 210, and a process graphic viewer 234, a portion of the run-time implementation 220. The process graphic editor 232 is connected to the process graphic viewer 234 by an intersubsystem interface 236 in the download language. The process control environment 100 also includes a control subsystem 240 which configures and installs control modules and equipment modules in a definition and module editor 242 and which executes the control modules and the equipment modules in a run-time controller 244. The definition and module editor 242 operates within the configuration implementation 210 and the run-time controller 244 operates within the run-time implementation 220 to supply continuous and sequencing control functions. The definition and module editor 242 is connected to the run-time controller 244 by an intersubsystem interface 246 in the download language. The multiple subsystems are interconnected by a subsystem interface 250.

The configuration implementation 210 and the run-time implementation 220 interface to a master database 260 to support access to common data structures. Various local (non-master) databases 262 interface to the master database 260, for example, to transfer configuration data from the master database 260 to the local databases 262 as directed by a user. Part of the master database 260 is a persistent database 270. The persistent database 270 is an object which transcends time so that the database continues to exist after the creator of the database no longer exists and transcends space so that the database is removable to an address space that is different from the address space at which the database was created. The entire configuration implementation 210 is stored in the persistent database 270.

The run-time implementation 220 interfaces to the persistent database 270 and to local databases 262 to access data structures formed by the configuration implementation 210. In particular, the run-time implementation 220 fetches selected equipment modules, displays and the like from the local databases 262 and the persistent database 270. The run-time implementation 220 interfaces to other subsystems to install definitions, thereby installing objects that are used to create instances, when the definitions do not yet exist, instantiating run-time instances, and transferring information from various source to destination objects.

Figure 3:
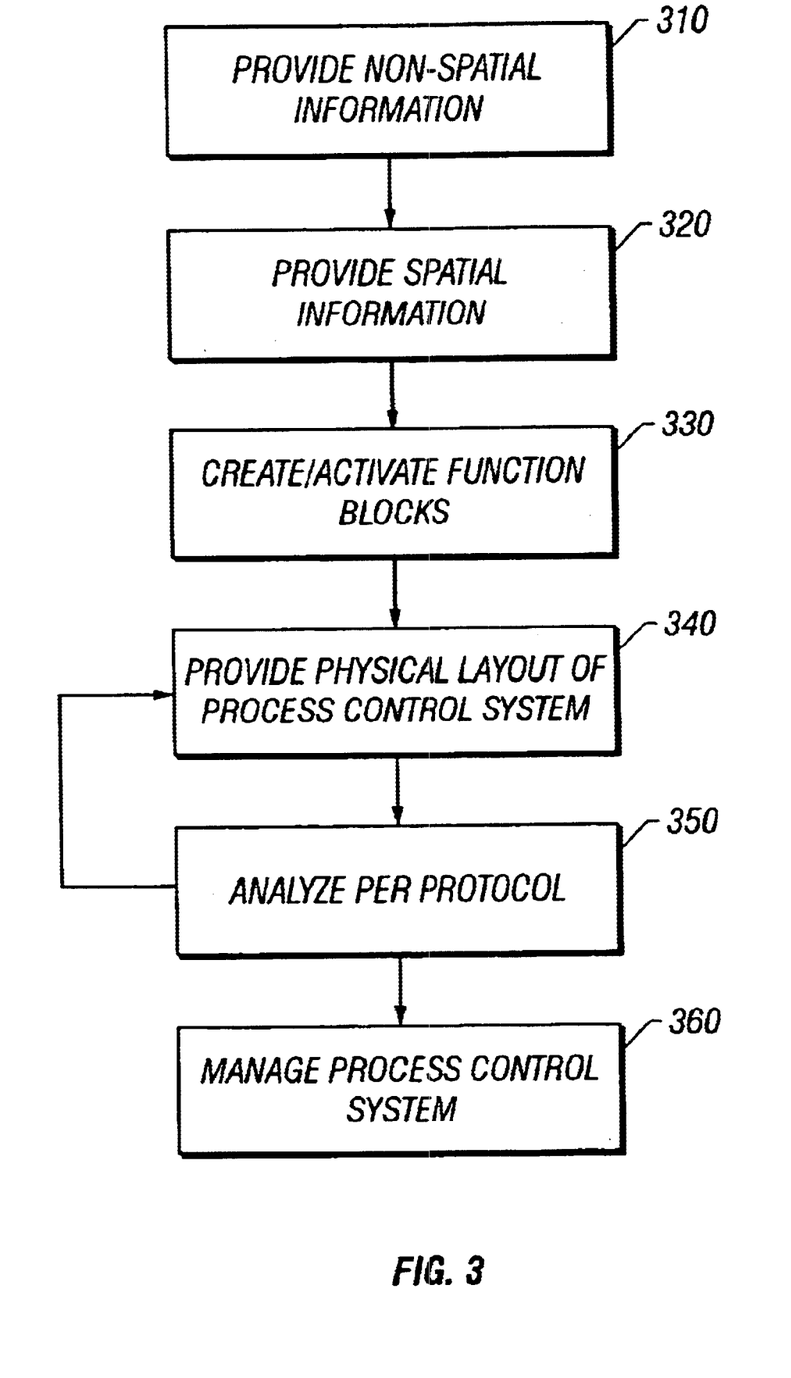
FIG. 3 is a flow chart illustrating the operation of a tool in accordance with the present invention.

Referring to FIG. 3, a flow diagram illustrating the operation of the tool 120 is shown. The different steps of the tool 120 operate according to a "Wizard" functionality as is present in various programs which run under a WINDOWS™ operating system. After each step is completed, the user then transfers to the next step by actuating a "NEXT" button or the like. If the user does not want to proceed then the user can exit the tool by actuating an "EXIT" button or the like.

In Step 310, the user provides the tool with information relating to the non-spatial characteristics of the process control network. This information includes such things as information about the customer, the devices used, calibration data, tag names, cable type, power supply characteristics and card, segment, and junction configuration information. The customer information may include the name of the customer, the name of the company, the location of the facility at which the network is located, the name of the representative providing the tool and the name of a contact for that representative. The card configuration information may provide the user with information about the type of cards used and operations which are used for analyzing the process control network 100. The segment configuration information may include the voltage of the power supply, the cable type (including information about the gauge of the wire that is used within the cable as well as other characteristics of the cable). The junction configuration information may include information regarding devices that are coupled to the junction and how the coupling to the junction is configured, including spur cable type, and the type of instrument that is coupled to the junction box. In the preferred embodiment, the instrument is a device that conforms to the Fieldbus protocol. The user may optionally assign a tag identification to the instrument.

To configure a card, a user selects a controller card from a list of available controller cards. After the card is selected, then the pertinent information for the selected controller card may be provided to the tool. Essentially, by selecting a controller card, the user configures a segment of the network. In the preferred embodiment, each controller card may control two segments; however, depending upon the controller card more of less segments may be controlled by a controller card. While the segments are being configured, the user may access a summary of the information that has been provided to the tool 120.

In Step 320, the user provides spatial information regarding the facility to the tool. In particular, the physical layout of the facility including floor plan size, instrument type, size, and location, and wire frame representations are provided. This information may be provided to the tool by the user or imported from another tool such as a 3D Toolkit, for example, Open Inventor from TGS.

In Step 330, function blocks are created and activated. In the Fieldbus protocol, function blocks provide the control of system behavior and can include such functions as calibration procedures, parameter procedures, and communication procedures. Each Fieldbus device may have several function blocks. The arrangement and interconnections of the blocks determine the function of the Fieldbus devices.

In Step 340, the physical layout of the process control system is applied to the spatial information regarding the facility layout. Function blocks and devices are wired together, typically following wire frames and the wiring of other devices in the facility. The layout may be done manually by the user or the tool 120 may automatically generate the physical layout of the process control system. Information such as the length of a segment of cable from a controller to a junction or from a junction to another junction and the length of a spur may be automatically generated and calculated from the spatial layout of the refining or manufacturing facility. In another embodiment, the connection of the function blocks and devices can first be connected logically, and at a later time applied to the spatial information regarding the facility.

In Step 350, the configuration of the process control system is checked for conformance to the requirements of the selected-protocol. All of the spur lengths of a segment are checked to assure that the spur lengths do not exceed a predetermined spur length as defined by the standard protocol. The spur lengths are limited by the number of instruments on the segment (per segment). I.e., the fewer the number of instruments, the longer the allowable spur length per segment. The number of devices per segment is also checked to assure that the number of devices do not exceed a predetermined number of devices. The number of devices that are allowed may vary based upon the controller that is used by the process control network. In the preferred embodiment, the controller allows 16 devices to be coupled to the bus per segment. However, the present Fieldbus standard allows up to 32 devices to be coupled to the bus per segment. The total current draw per segment is checked to assure that the current draw does not exceed the maximum current draw allowed by the standard protocol. In the preferred embodiment, the maximum current draw allowed is 375 mAmps/segment. The total segment cable length (including spur length) is checked to assure that the length does not exceed the maximum segment length allowed by the standard protocol. In the preferred embodiment, the maximum segment length allowed is 6232 feet or 1900 meters. The minimum voltage per segment is checked to assure that the voltage at any device which is coupled to the process control network exceeds or equals the voltage set forth by the standard protocol. In the preferred embodiment, this voltage is 12.5 volts. If one or more of the values are not within the limits defined by the protocol, the user may return to step 340 to revise the configuration of the process control network.

Once the process control network has been configured, the user can begin managing the process control system, step 360, utilizing the non-spatial and spatial information supplied. For managing field devices, many types of communication is available, including: obtaining port and communication statistics, obtaining status of the field device, viewing and changing resource configuration and parameters, initiating master reset or self test of the field device, displaying status of the sensors and changing the sensor upper, lower and zero trim. By providing spatial information with the managing communications listed above, the managing features of the process control system are more efficient and easier to use.

The spatial information regarding the facility can be fully three dimensional, including three dimensional walls, devices, workstations etc. The spatial information regarding the facility may also be a two dimensional blue print of the facility with the configuration of the process control system mapped thereon, or any combination of two and three dimensions as suits the user application.

In other embodiments, the tool may provide the user with a way of obtaining a bill of materials for the process control network design. The tool may also automatically provide the layout of the process control system within the physical layout of the facility and assure that the protocol requirements are met.

In another embodiment, the user can configure the system without providing the spatial information of the facility, and at a later time add the spatial information for use in the management of the process control system.

It will be appreciated that while functions are described as having a certain order of events, any other order in which the information is provided or the steps completed is within the scope of the invention.

Figure 4:
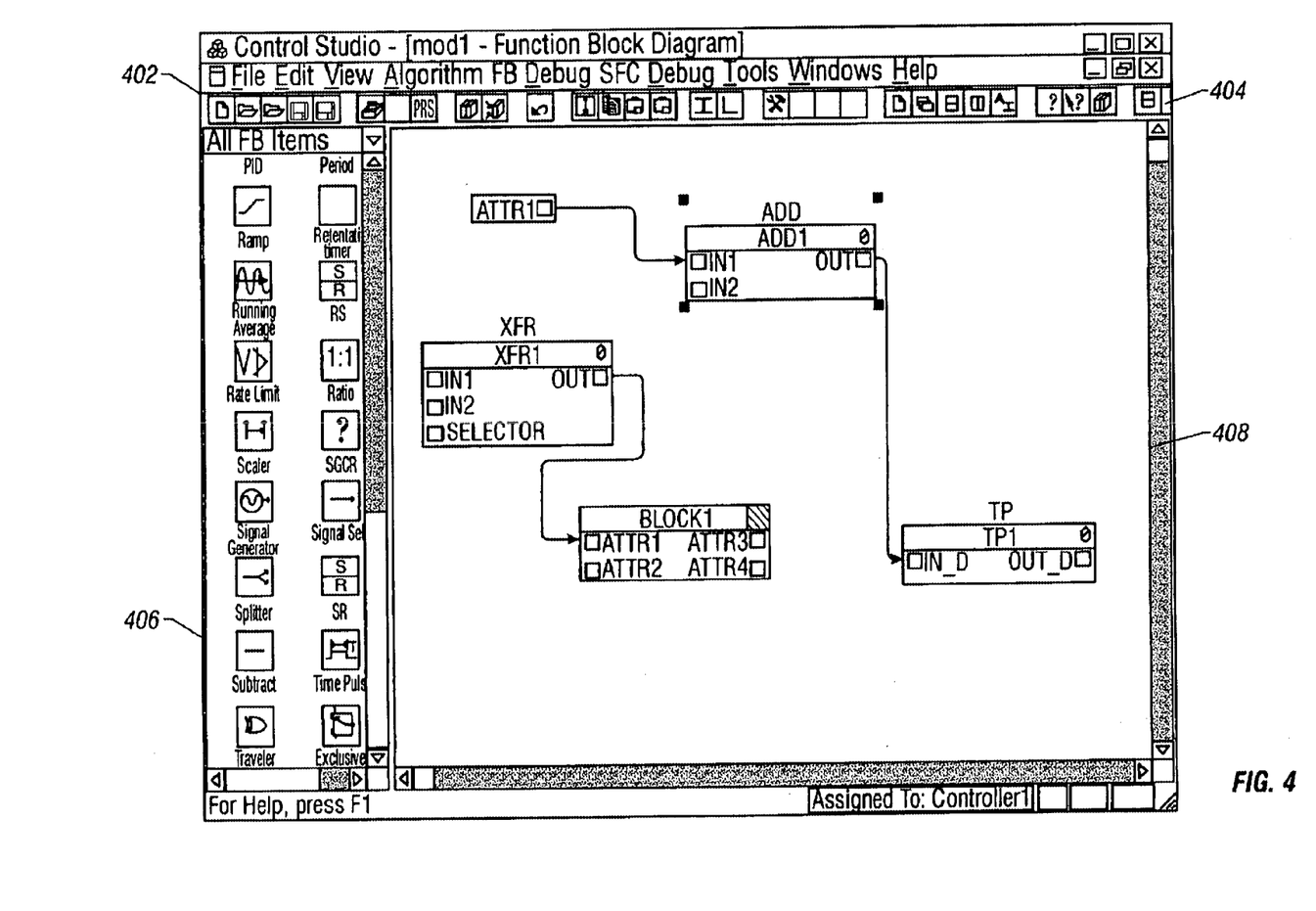
FIG. 4 is a screen presentation of the configuration portion of the tool showing logical connections between functions and devices of a process control system.

Referring to FIG. 4, a screen presentation of the configuration portion of the tool using the logical connections of the process control system are shown in the main control window of the tool 120. The screen representation of tool 120 includes textual pull down menus 402, pictographic menu 404, a stencil portion presentation 406 and a diagram portion screen presentation 408. Stencil items 420 are displayed within the stencil portion presentation 406. The user's diagram of the process control environment design is presented in the diagram portion screen presentation. This diagram of the process control design environment is referred to as the process control environment view. Each of the presentations in the main window is re-sizable and relocatable by the user in accordance with known windowing techniques. The tool 120 tracks the location and size of the panes of the main window by maintaining persistent object data including coordinates within the two-dimensional display, as well as style and other information.

When designing a process control environment using logical connections, a user simply actuates a stencil item from the stencil portion presentation 408, drags the actuated stencil item to a desired location within the diagram portion screen presentation 408 and drops the actuated stencil item in a desired location. Control studio object system 130 then creates a diagram item that allows the diagram to create an object with all of the information necessary for configuring a process control environment. Because the stencil items are objects which include all of the necessary information for the diagram to configure a process control environment, when the process control environment design is completed within the diagram portion, this design may be directly downloaded to the appropriate portions of the process control environment.

Referring to FIG. 4 and FIGS. 5A–5C, screen presentations of the spatial layout portion of the tool using spatial information of the facility in the layout of the process control system are shown. The tool provides for viewing of different angles and magnifications of the spatial layout of the process control system. The presentation may be in grayscale or in color. The screen presentations may be included within a window of tool 120 such analogous to the diagram portion screen presentation window 408. Other ways of presenting the spatial information are within the scope of the invention.

When designing a process control environment using the spatial information of the facility, a user starts by either importing the physical layout of the facility or by creating the layout in the diagram portion of the main control window of the tool 120. To add field devices or functions, a user simply actuates a stencil item from the stencil portion presentation 408, drags the actuated stencil item to a desired location in the spatial representation of the facility within the diagram portion screen presentation 408 and drops the actuated stencil item in a desired location. As well as rectangular representations of functions, the stencil items include three dimensional representations of items found in a refining or manufacturing facility, such as valves, pumps, tanks, pipes, etc. A spatial portion of the control studio object system 130 then generates a diagram item with the information necessary for configuring a process control environment within the spatial layout of a facility. Because the stencil items are objects which include all of the necessary information for the diagram to configure a process control environment within the spatial layout of a facility, when the process control environment design is completed within the diagram portion, this design may be directly downloaded to the appropriate portions of the process control environment including the spatial portion of the control studio object system.

Figure 5A:
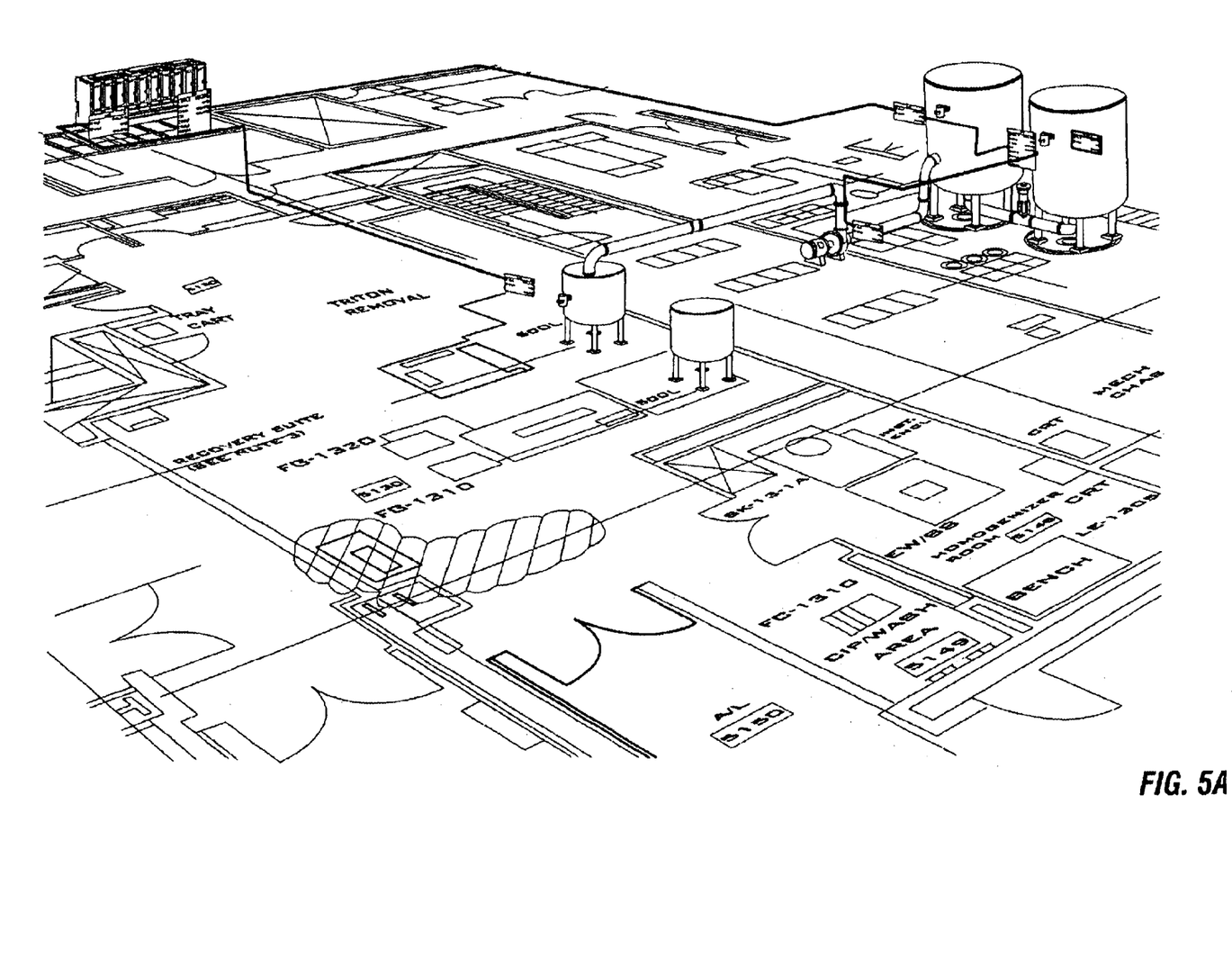
FIGS. 5A–5C are views of the spatial portion screen presentation showing physical connections between functions and devices of a process control system and their relative positions in the spatial layout of the facility.
Figure 5B:
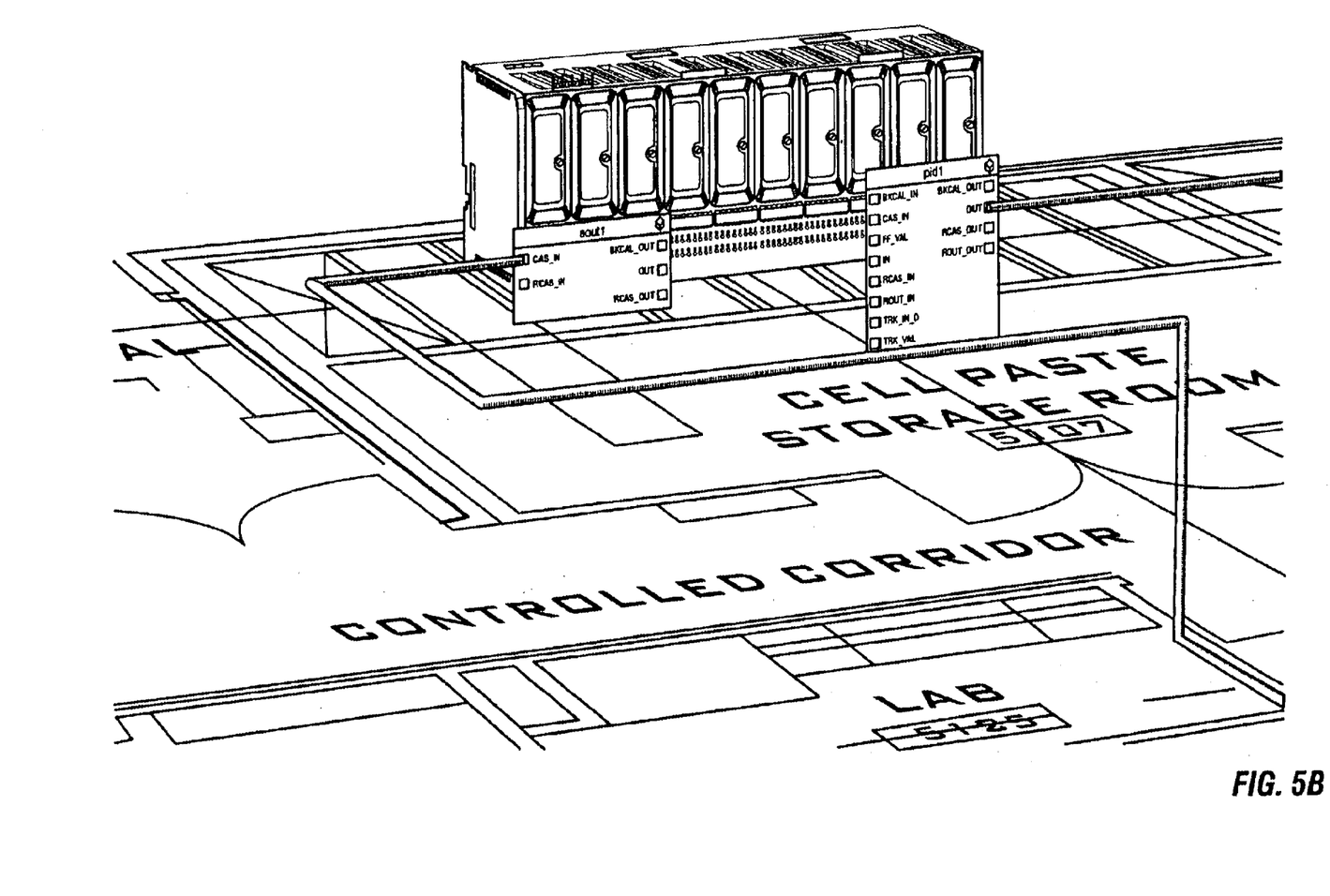
Figure 5C:
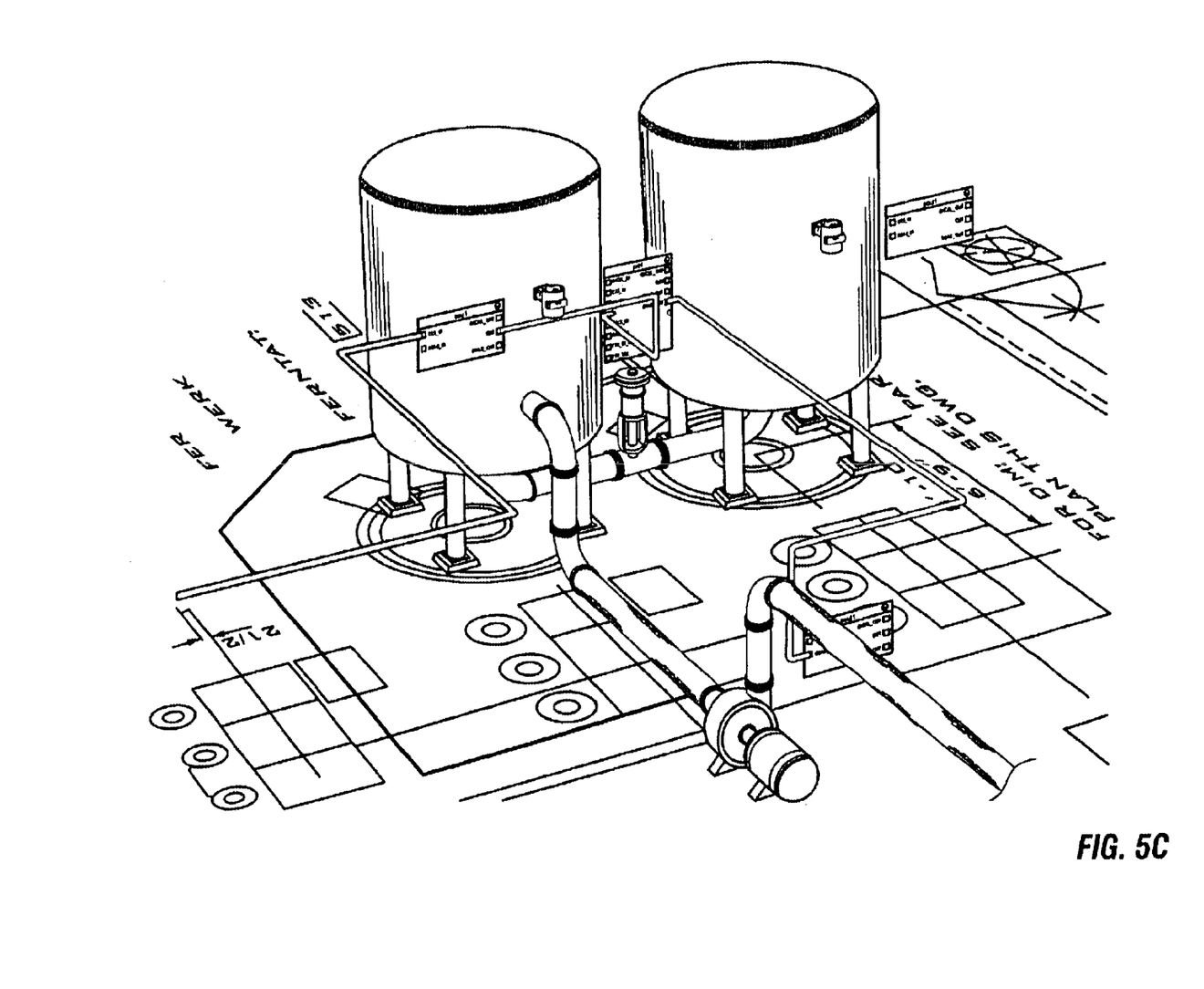

Referring again to FIGS. 5A–5C, examples of a spatial screen presentation 500 are shown including an example of the physical layout of the facility in a spatial view. More specifically, FIG. 5A shows a presentation of a physical layout of a facility over a schematic view of the facility. The spatial presentation further includes a physical and logical representation of the various components of the process control environment. Accordingly, a user may advantageously view the physical locations of the various components of the process control environment superimposed over a schematic view of the facility. FIGS. 5B and 5C show enlarged and rotated views of portions of the diagram presentation of FIG. 5A. FIGS. 5B–5C thus show examples of how a user can access portions of the diagram presentation such as that shown in FIG. 5A to obtain a better view of particular portions of the process control environment. It will be appreciated that the spatial presentation need not necessarily be superimposed over the schematic view.

Other Embodiments

Other embodiments are within the following claims.

For example, while the protocol in which the preferred embodiment is described analyzes a process control network for a Fieldbus protocol, it will be appreciated that any protocol may be analyzed by adjusting the appropriate constraints.

Also, for example, while the preferred embodiment operates under a WINDOWS operating system and uses a Wizard type of presentation, it will be appreciated that these details are not intended to be limiting of the overall concept of the invention.

Also, while particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention, including but not limited to implementations in other programming languages. Additionally, while the preferred embodiment is disclosed as a software implementation, it will be appreciated that hardware implementations such as application specific integrated circuit implementations are also within the scope of the following claims.

What is claimed is:

1. A method for configuring and managing a process control network, the process control network including a computer having a processor and a memory, the method comprising:

providing the computer with information regarding a spatial layout of a facility;

providing the computer with information regarding the configuration of the process control network;

presenting a layout of the configuration of the process control network in relation to the spatial layout of the facility; and analyzing the layout of the process control network in relation to the physical layout of the facility to assure that the layout of the process control network conforms to criteria of a standard protocol.

2. The method of claim 1, further comprising managing the process control system in a run-time environment.

3. The method of claim 2, wherein the managing the process control system includes providing a blinking device representation in a spatial view of the process control system to indicate active alarms.

4. The method of claim 1, wherein the providing a layout of the process control network includes automatically generating the layout.

5. The method of claim 1, wherein the providing a layout of the process control network includes displaying the layout of the process control network over a schematic view of a facility.

6. An apparatus for configuring and managing a process control network, the apparatus comprising:

a computer having a processor and a memory;

a tool operated on the computer;

means for providing the computer with information regarding a spatial layout of a facility;

means for providing the computer with information regarding materials used in the process control network;

wherein the tool is used to provide a layout of the process control network applied to the spatial layout of the facility; and wherein the tool is used to analyze the layout of the process control network applied to the spatial layout of the facility to assure that the layout of the process control network conforms to criteria of a standard protocol.

7. The apparatus of claim 6, further comprising wherein the tool is used for managing the process control system in a run-time environment.

8. The apparatus of claim 7, wherein the tool used for managing the process control system includes a blinking device representation in a spatial view of the process control system to indicate active alarms.

9. The apparatus of claim 6, wherein the tool used to provide a layout of the process control network further includes the tool automatically generating the layout.

10. The apparatus of claim 6, wherein the tool is used to display the layout of the facility over a schematic view of the facility.

11. A method for configuring and managing a process control network, the method comprising:

providing a tool operated on a computer;

providing the computer with information regarding materials used in the process control network;

using the tool to provide a layout of the process control network; and providing at a later time the computer with information regarding a spatial layout of a facility;

applying the layout of the process control network to the spatial layout of the facility and analyzing the layout of the process control network in relation to the physical layout of the facility to assure that the layout of the process control network conforms to criteria of a standard protocol.

\* \* \* \* \*

UNITED STATES PATENT AND TRADEMARK OFFICE
CERTIFICATE OF CORRECTION

PATENT NO. : 6,772,017 B1
DATED : August 3, 2004
INVENTOR(S) : Dove et al.

It is certified that error appears in the above-identified patent and that said Letters Patent is hereby corrected as shown below:

Column 3,
Line 52, please delete "mange" and insert -- manage --.

Column 9,
Line 22, please delete "more of less" and insert -- more or less --.
Line 58, please delete "selected-protocol" and insert -- selected protocol --.

Column 10,
Line 2, please delete "16" and insert -- 16 --.
Line 4, please delete "32" and insert -- 32 --.

Column 12,
Lines 54-55, please delete "wherein the managing the process control system" and insert -- wherein managing the process control system --.

Column 14,
Line 17, please delete "facility" and insert -- facility; --.

Signed and Sealed this

Twenty-sixth Day of April, 2005

JON W. DUDAS
*Director of the United States Patent and Trademark Office*